US009667910B2

(12) United States Patent
Messmer

(10) Patent No.: US 9,667,910 B2
(45) Date of Patent: *May 30, 2017

(54) METHOD AND SYSTEM FOR VIDEO EQUALIZATION

(71) Applicant: DOLBY LABORATORIES LICENSING CORPORATION, San Francisco, CA (US)

(72) Inventor: Neil Messmer, Langley (CA)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/146,432

(22) Filed: May 4, 2016

(65) Prior Publication Data

US 2016/0249009 A1  Aug. 25, 2016

Related U.S. Application Data

(63) Continuation of application No. 14/349,288, filed as application No. PCT/US2012/060230 on Oct. 15, 2012, now Pat. No. 9,338,389.

(Continued)

(51) Int. Cl.
*H04N 5/91* (2006.01)
*H04N 5/20* (2006.01)
(Continued)

(52) U.S. Cl.
CPC .......... *H04N 5/91* (2013.01); *H04N 5/20* (2013.01); *H04N 5/265* (2013.01); *H04N 9/64* (2013.01);
(Continued)

(58) Field of Classification Search
USPC ........ 348/725, 448, 678, 679, 672; 382/274, 382/169, 298; 375/240.12, 229–236
See application file for complete search history.

(56) References Cited

U.S. PATENT DOCUMENTS 4,933,641 A * 6/1990 Hsiung .................... G06G 7/24
327/351
5,144,442 A    9/1992 Ginosar
(Continued)

FOREIGN PATENT DOCUMENTS

CN    101170708    4/2008
CN    101207754    6/2008
(Continued)

OTHER PUBLICATIONS

Anonymous "Final Cut Pro 7 User Manual" Mar. 16, 2010.
(Continued)

*Primary Examiner* — Paulos M Natnael

(57) ABSTRACT

Video equalization including performing equalization such that a sequence of images have dynamic range (optionally other characteristics) that is constant to a predetermined degree, where the input video includes high and standard dynamic range videos and images from both. Equalization is performed with a common anchor point (e.g., 20% gray level, or log mean of luminance) input video and the equalized video, and such that the images determined by the equalized video have at least substantially the same average luminance as images determined by the input video. Other aspects are systems (e.g., display systems and video delivery systems) configured to perform embodiments of the equalization method.

27 Claims, 6 Drawing Sheets

Related U.S. Application Data

(60) Provisional application No. 61/549,433, filed on Oct. 20, 2011.

(51) Int. Cl.
*H04N 9/68* (2006.01)
*H04N 21/234* (2011.01)
*H04N 9/64* (2006.01)
*H04N 5/265* (2006.01)
*H04N 5/222* (2006.01)

(52) U.S. Cl.
CPC ......... *H04N 9/68* (2013.01); *H04N 21/23424* (2013.01); *H04N 5/222* (2013.01)

(56) References Cited

U.S. PATENT DOCUMENTS

| | | | |
|---|---|---|---|
| 5,210,610 A | 5/1993 | Kanashiki | |
| 5,822,018 A | 10/1998 | Farmer | |
| 5,835,618 A | 11/1998 | Fang | |
| 5,959,696 A | 9/1999 | Hwang | |
| 6,130,724 A | 10/2000 | Hwang | |
| 6,333,767 B1 | 12/2001 | Patel | |
| 6,507,668 B1 | 1/2003 | Park | |
| 6,850,642 B1 | 2/2005 | Wang | |
| 7,038,733 B2 | 5/2006 | Dent | |
| 7,203,375 B2 | 4/2007 | Park | |
| 7,227,559 B2 | 6/2007 | Aoki | |
| 7,561,753 B2 | 7/2009 | Hutchinson | |
| 7,636,496 B2* | 12/2009 | Duan | G06T 5/007 345/589 |
| 8,248,492 B2 | 8/2012 | Mitsunaga | |
| 8,249,337 B2 | 8/2012 | Whitehead | |
| 8,330,768 B2 | 12/2012 | Mantiuk | |
| 8,339,475 B2* | 12/2012 | Atanassov | G06T 5/007 348/229.1 |
| 8,483,479 B2 | 7/2013 | Kunkel | |
| 8,488,029 B2* | 7/2013 | Yamashita | H04N 5/2351 348/254 |
| 9,066,070 B2 | 6/2015 | Su | |

| | | | |
|---|---|---|---|
| 2004/0207760 A1 | 10/2004 | Filliman | |
| 2004/0213478 A1 | 10/2004 | Chesnokov | |
| 2005/0117799 A1 | 6/2005 | Fuh | |
| 2006/0104533 A1* | 5/2006 | Daly | G06T 5/009 382/254 |
| 2007/0269132 A1 | 11/2007 | Duan | |
| 2008/0024673 A1 | 1/2008 | Cha | |
| 2008/0095408 A1 | 4/2008 | Yokohata | |
| 2009/0066816 A1 | 3/2009 | Wakagi | |
| 2009/0096710 A1* | 4/2009 | Raman | G09G 3/2011 345/1.1 |
| 2011/0158653 A1 | 6/2011 | Mazed | |
| 2011/0316973 A1 | 12/2011 | Miller | |
| 2012/0201456 A1 | 8/2012 | El-Mahdy | |
| 2014/0002737 A1* | 1/2014 | Damberg | G06T 5/009 348/488 |
| 2014/0105289 A1* | 4/2014 | Su | H04N 19/00424 375/240.12 |

FOREIGN PATENT DOCUMENTS

| | | |
|---|---|---|
| CN | 101340510 | 1/2009 |
| CN | 101340511 | 1/2009 |
| CN | 101394487 | 3/2009 |
| CN | 101707666 | 5/2010 |
| CN | 102006425 | 4/2011 |
| CN | 102158653 | 8/2011 |
| EP | 0263765 | 4/1988 |
| JP | 51-30413 | 5/1993 |
| JP | H10-243261 | 9/1998 |
| JP | 2004-118424 | 4/2004 |
| JP | 5086067 | 11/2007 |
| JP | 2009-27550 | 2/2009 |
| WO | 2007/111069 | 10/2007 |
| WO | 2013/009651 | 1/2013 |

OTHER PUBLICATIONS

Xiong, Y. et al "Color and Luminance Compensation for Mobile Panorama Construction" Proc. of the International Conference on Multimedia, Jan. 1, 2010, p. 261, New York, New York, USA.

\* cited by examiner

METHOD AND SYSTEM FOR VIDEO EQUALIZATION

CROSS-REFERENCE TO RELATED APPLICATIONS

This application is a continuation of U.S. patent application Ser. No. 14/349,288, filed Apr. 2, 2014, which is a U.S. national stage of International Application No. PCT/US2012/060230, filed Oct. 15, 2012, which claims priority to U.S. Provisional Application No. 61/549,433, filed Oct. 20, 2011, each of which is hereby incorporated by reference in its entirety.

BACKGROUND OF THE INVENTION

1. Field of the Invention

The invention pertains to methods and systems for equalizing segments of video of different types (e.g., high dynamic range (HDR) video and standard dynamic range (SDR) video) such that a sequence of images determined by a sequence of the equalized segments has dynamic range (and optionally also at least one other characteristic, e.g., at least one of color gamut, and white point) that is at least substantially constant. Examples of systems configured to perform the equalization are video sources (e.g., broadcast installations) and display systems.

2. Background of the Invention

Throughout this disclosure including in the claims, the expression performing an operation "on" signals or data (e.g., filtering, scaling, or transforming the signals or data) is used in a broad sense to denote performing the operation directly on the signals or data, or on processed versions of the signals or data (e.g., on versions of the signals that have undergone preliminary filtering prior to performance of the operation thereon).

Throughout this disclosure including in the claims, the noun "display" and the expression "display system" are used as synonyms.

Throughout this disclosure including in the claims, the term "segment" of video (e.g., "segment" of a video program) denotes video data or a video signal indicative of at least one frame (typically, a sequence of consecutive frames). A display system can display each frame as an image, and a sequence of the frames as a sequence of images, each said image having a dynamic range (a range of displayed pixel intensities).

Throughout this disclosure including in the claims, the expression that an image is "determined by" video is used in a broad sense (which contemplates that the video may be an equalized or otherwise filtered version of input video) to denote both an image determined by a frame of the video and an image determined by a corresponding frame of the input video.

Throughout this disclosure, the expression "encoding" of video (e.g., a video channel) denotes mapping a sequence of samples of the video to a set of values ("code values") indicative of displayed intensities in a range from a minimum intensity (black level) to a maximum intensity, where each of the code values determines a displayed intensity of a pixel (or a color component of a pixel, or a luminance or chroma value of a pixel, or another pixel component) when the encoded video is displayed. For example, a video channel may be encoded in a linear manner (so that the code values of the encoded video channel are linearly related to displayed intensity values) or a nonlinear manner (so that the code values of the encoded video channel are nonlinearly related to displayed intensity values).

Throughout this disclosure including in the claims, the expression "encoded video" denotes video determined by one or more channels of code values, each of the channels comprising a sequence of code values. For example, conventional Rec. 709 RGB video is encoded video comprising three channels of code values: a red channel comprising a sequence of red (R) code values (red color component values), a green channel comprising a sequence of green (G) code values (green color component values), and a blue channel comprising a sequence of blue (B) code values (blue color component values). For another example, conventional YCrCb video is encoded video comprising three channels of code values: a Y channel comprising a sequence of luminance or luma code values (e.g., luminance code values (Y), each of which is a weighted sum of linear R, G, and B color components, or luma code values (Y), each of which is a weighted sum of gamma-compressed R', G', and B' color components), a Cr channel comprising a sequence of Cr (chroma) code values, and a Cb channel comprising a sequence of Cb (chroma) code values.

Throughout this disclosure, the expression "peak white level" (or white point) denotes the smallest code value (of a channel of encoded video) indicative of a pixel or pixel component (e.g., a color component of a pixel, or a luminance or chroma value of a pixel) having maximum displayed intensity when the encoded video is displayed (assuming that the displayed pixels are determined by code values of the channel that include the entire range of code values available for said channel, and code values of any other channel that determine the displayed pixels are identical for all the displayed pixels). To display the encoded video channel, a video system may map to the maximum displayed intensity (e.g., clip or compress to the maximum displayed intensity) any code values of the channel that are larger than the peak white level.

Throughout this disclosure, the expression "black level" denotes the largest code value (of a channel of encoded video) indicative of a pixel or pixel component (e.g., a color component of a pixel, or a luminance or chroma value of a pixel) having minimum displayed intensity when the encoded video is displayed (assuming that the displayed pixels are determined by code values of the channel that include the entire range of code values available for said channel, and code values of any other channel that determine the displayed pixels are identical for all the displayed pixels). To display the encoded video channel, a video system may map (e.g., clip or compress), to the minimum displayed intensity, any code values of the channel that are smaller than the black level.

Throughout this disclosure, the expression "standard dynamic range" or "SDR" (or "low dynamic range" or "LDR") channel denotes a channel of encoded video (e.g., a channel of a video signal indicative of encoded video data) having bit depth equal to N (e.g., N=8, or 10, or 12), where the code values available for the channel are in a range from a black level, X (referred to herein as a "standard black level"), to a peak white level, Z (referred to herein as a "standard white level"), where $0 \leq X < Z \leq 2^N - 1$. It should be appreciated that the dynamic range of the content transmitted by a channel is often of greater importance than the dynamic range of the channel, and that either encoded video having a first dynamic range (sometimes referred to as "low dynamic range video" or "standard dynamic range video" or "SDR video") or encoded video having a dynamic range that is greater than the first dynamic range (sometimes referred to as "high dynamic range video" or "HDR video" with reference to the low dynamic range video) could be transmitted by an SDR channel with the same bit precision but with different granularity.

Throughout this disclosure including in the claims, the expression "standard dynamic range" (or "SDR" or "low dynamic range" or "LDR") video system denotes a system configured to display, in response to SDR video having at least one SDR channel, an image sequence (or image) whose luminance has a dynamic range (sometimes referred to herein as a standard dynamic range). Herein, the term "luminance" (of an image or image sequence) is used in a broad sense to denote luminance of the image or image sequence, or intensity (or brightness) of the achromatic portion of the image or image sequence, or intensity (or brightness) of the image or image sequence. It should be appreciated that the peak brightness of a physical display can change depending on its white point.

Throughout this disclosure, the expression "high dynamic range" (or "HDR") channel, used with reference to an SDR channel (or SDR video whose channels are all SDR channels), denotes a channel of encoded video (e.g., a channel of a video signal indicative of encoded video data) having dynamic range greater than that of the SDR channel (or than that of each channel of the SDR video). For example, the HDR channel may have bit depth greater than N (where each SDR channel has bit depth equal to N) or the code values available for the HDR channel may be in a range from a minimum value, Min, to a maximum value, Max, where $0 \leq Min < X < Z < Max \leq 2^N - 1$, where X is a standard black level, and Z is a standard white level (and where the code values available for each SDR channel are in the range from X to Z.

An example of HDR video is "visual dynamic range" (VDR) video, which is video data (or a video signal) capable of being displayed by a display system with the full dynamic range perceivable by a human viewer under normal display viewing conditions. One type of VDR video is described in PCT International Application PCT/US2010/022700, by Dolby Laboratories Licensing Corporation (published as PCT International Application Publication No. WO 2010/104624 A2).

In one conventional SDR display system which operates with 8 bit YCbCr video signals, with the code value 235 considered the maximum level (so that the code values in the range from 236-254 are not used to display images), code value 16 (cast into absolute units for a reference display) represents about 0.01 cd/m² (0.01 candelas per square meter, where the unit "candelas per square meter" is sometimes referred to as "nits) and code value 235 represents about 100 cd/m². The maximum dynamic range of the SDR content of such a system is thus 0 through 100 nits. The maximum dynamic range of the SDR content of some other conventional SDR display systems is 0 through 500 nits. It should be appreciated that the present invention is applicable to encoded video of any bit depth, although some systems and methods are described with reference to encoded video of a specific bit depth (for clarity).

A video broadcast system may broadcast both SDR and HDR video content, for example, a video program comprising a sequence of HDR video segments (e.g., segments of a movie or TV program) time-division multiplexed with SDR video segments (e.g., commercials).

FIG. 1, which depicts a conventional video broadcast system, includes a simplified block diagram of national broadcaster installation 1 (e.g., NBC National) and a simplified block diagram of regional broadcaster installation 3 (e.g., Seattle NBC). Installation 1 (sometimes referred to herein as subsystem 1) is configured to broadcast a video output stream to regional installation 3 (sometimes referred to herein as subsystem 3) via delivery subsystem 2. Subsystem 2 may implement a standard (e.g., cable or satellite) transmission path. The video output stream may be stored by subsystem 2 (e.g., in the form of a DVD or Blu ray disc), or transmitted by subsystem 2 (which may implement a transmission link or network), or may be both stored and transmitted by subsystem 2.

In subsystem 1, switcher 5 is coupled to receive video input streams 4A, 4B, and 4C (which may be stored on suitable storage media). Input streams 4A, 4B, and 4C are typically of different types in the sense that at least one video characteristic of each (e.g., at least one of color gamut, dynamic range, and white point) differs from at least one characteristic of a least one other one of said input streams. Each of streams 4A, 4B, and 4C is an encoded video stream in the sense that it comprises a sequence of code words indicative of input video. Switcher 5 (sometimes referred to as "to the air" switcher 5) is configured to select which of the input streams is to be broadcast, and to time-division multiplex the selected content (or insertion spots or other markers for content) into the combined stream to be output to delivery subsystem 2. Switcher 5 typically can insert into the combined stream either insertion spots for commercials (downstream trigger points) or commercials themselves. Within digital modulator 7 of subsystem 1, the combined (time-division multiplexed) stream is compressed (e.g., via MPEG-2 encoding) and typically also scrambled, and modulated for delivery over a physical network. For simplicity, management software is not shown in FIG. 1, but installation 1 would typically employ such software to implement scheduling, tracking of commercials, and billing.

In demodulator 9 of regional broadcasting installation (subsystem) 3, a delivered signal received from subsystem 2 is demodulated, to recover an encoded video stream (e.g., an MPEG-2 encoded video stream of the type generated in modulator 7 of installation 1). In splicing subsystem 6, local commercials, live sports casts, and news shows (which are typically MPEG encoded by local encoder 8) are spliced (time-division multiplexed), as required, into the stream recovered in demodulator 9.

Throughout the delivery chain implemented by the FIG. 1 system, there are several sources of content that can be placed into distribution, including the sources coupled to the inputs of switcher 5 and sources coupled to the inputs of encoder 8 (or splicer 6). Video from each source can have a different dynamic range, gamut (color gamut), or even white point. Thus consumer who views a display generated in response to the broadcast output (i.e., a time-division multiplexed sequence of video segments from different ones of the sources) may notice undesirable fluctuations in brightness (and/or color gamut and/or color temperature and/or at least one other parameter) during transitions between the segments (e.g., during transitions between commercial and non-commercial content). This problem can be especially severe when the broadcast video is a sequence of HDR (e.g., VDR) video segments and SDR video segments.

Thus, implementation of a visual dynamic range (VDR) or other HDR video delivery pipeline will encounter obstacles due to the need to deliver video content from multiple sources through the same pipeline, where the content from each source is, in general, of a different type (e.g., has different dynamic range, color gamut, and/or white point).

For example, during capture of a sporting event, a mixture of HD and SD cameras could be employed to generate both HDR (e.g., VDR) and SDR video content to be delivered. If the content is left unprocessed, the image displayed (in response to the content delivered via the pipeline) could have large steps in luminance levels or different gamuts. For example, the bitstream sent down the pipeline might include SDR content captured with SD cameras which has half the brightness and wash out (smaller gamut and white point) than HDR studio content captured with HD cameras. Consider another example in which an HDR television show to be delivered via a pipeline has SDR commercial content inserted into the stream delivered over the pipeline. A consumer who views the pipeline output may notice fluctuations in brightness during transitions between commercial and non-commercial content.

Other video delivery pipelines may need to deliver video source content (e.g., commercials, TV shows, and movies) having different dynamic ranges, gamuts and/or white points, via broadcast, or OTT delivery ("over the top" delivery by internet-based technology) or VOD (video on demand) delivery. The inventor has recognized that, in this context, there is a need to be able to adjust all the content intelligently to ensure a consistent viewing experience. For example, there may be a need to adjust the display of delivered content at the terminating display when content switches between a VDR movie (or TV show) and commercials. The commercials may have been introduced into the delivered stream at the last moment and this introduction could result in a mixture of SDR and HDR formats within the streamed content. The overall brightness of the displayed content could have significant jumps and not be pleasing to the viewer. During video broadcast (or OTT or VOD delivery or VOD delivery), commercial vendors may not wish to store both an HDR (e.g., VDR) and SDR version of a commercial to be inserted in the stream to be delivered.

Some embodiments of the invention are methods (implemented at any of at different stages in a video delivery pipeline) for equalizing dynamic range of video content (e.g., captured camera data), typically by implementing an automated video equalization algorithm Video equalization in accordance with the invention can be implemented at various points in a delivery pipeline, e.g., at distribution (e.g., in a broadcast installation, or an OTT or VOD delivery installation), or in a display system which displays the delivered content. The inventor has recognized that managing video equalization at the display system can provide the benefit of ensuring a constant viewing experience while channel surfing, switching video sources, and proper adjustments to on-screen displays between the modes.

The inventor has also recognized that in order to preserve artistic intent, the inventive video equalization should be implemented with a common anchor point for the input video and equalized video, and so that the displayed image(s) determined by the equalized video have at least substantially the same average luminance as the displayed image(s) determined by the input video. In contrast, simple mapping of code values of input video (having one dynamic range) to code values of equalized video (having a different dynamic range) without a common anchor point would typically destroy the artistic intent of the input video's originator (e.g., it could cause the displayed images determined by the equalized video to have much different aesthetic characteristics than those determined by the input video).

BRIEF DESCRIPTION OF THE INVENTION

In a first class of embodiments, the invention is a method including a step of performing equalization on input video to generate equalized video, such that a sequence of images determined by the equalized video have dynamic range (and optionally also at least one other characteristic, e.g., at least one of color gamut and white point) that is constant to a predetermined degree (e.g., at least substantially constant), where the input video includes high dynamic range (HDR) video and standard dynamic range (SDR) video, and the images include at least one image determined by the high dynamic range video and at least one image determined by the standard dynamic range video. The equalization is performed with a common anchor point (e.g., a gray level at least substantially equal to a 20% gray level, or another predetermined gray level, or the log mean, or average, or geometric mean, or log of the geometric mean of luminance) for the input video and the equalized video, and such that the images determined by the equalized video have at least substantially the same average luminance as images determined by the input video. In some embodiments in the first class, the equalization includes a step of mapping code values of the SDR video to code values in a subrange of a full range of code values employed to encode the HDR video, such that the mapping expands the SDR video's dynamic range (or otherwise aligns the SDR video's dynamic range with that of the HDR video), while maintaining average luminance of the SDR video at least substantially unchanged and windowing the equalized SDR video and the equalized HDR video to a common anchor point (e.g., by mapping the SDR video's 20% gray level to the HDR video's 20% gray level, or mapping the log mean (or average, or geometric mean, or log of the geometric mean) of the SDR video's luminance to the log mean (or average, or geometric mean, or log of the geometric mean) of the HDR video's luminance).

In some embodiments in the first class (typically implemented in a broadcast installation or other video delivery installation), the method includes the steps of performing the equalization on segments of different streams of the input video to generate equalized video segments, and combining (e.g., time-division multiplexing) the equalized video segments into a combined video stream, wherein the equalization adjusts video of at least one of the segments of the input video such that images determined by the combined video stream have a dynamic range (and optionally also at least one other characteristic) that is at least substantially constant although the images are determined by frames, that do not have at least substantially constant dynamic range, of a sequence of different ones of the streams of the input video.

In some embodiments in the first class (typically implemented by a display system), the method includes a step of performing video equalization on segments of a video stream (e.g., a decoded version of an encoded video stream received from a video delivery system) to generate a sequence of equalized video segments, wherein the video equalization adjusts video of at least one of the segments such that a sequence of images determined by the sequence of equalized video segments has dynamic range (and optionally also at least one other characteristic) that is at least substantially constant, although images determined by the segments of the video stream do not have at least substantially constant dynamic range. Typically, these embodiments of the method also include a step of determining the video equalization to be performed on each of the segments by analyzing the video stream, or determining (from metadata provided with the video stream) the video equalization to be performed on each of the segments.

In another class of embodiments, the invention is a system configured to perform any embodiment of the inventive equalization method. In some such embodiments, the invention is a display system including an equalization stage configured to perform any embodiment of the inventive equalization method on input video to generate equalized video, and a subsystem coupled and configured to display images in response to the equalized video. In other embodiments, the inventive system is a video delivery system (e.g., a broadcast system). In some such embodiments, the video delivery system is or includes at least one of an upstream stage (e.g., national broadcast installation) configured to perform video equalization in accordance with the invention, and a downstream stage (e.g., regional broadcast installation) configured to perform video equalization in accordance with the invention.

In some embodiments, the invention is a processor configured to perform any embodiment of the inventive equalization method. In other embodiments, the invention is a system including such a processor and a subsystem for providing (e.g., generating) input video to be equalized in accordance with the invention, and optionally also one or both of a delivery subsystem configured to store and/or transmit an encoded representation of equalized video generated in accordance with the invention, and a display subsystem for displaying equalized video generated in accordance with the invention. Embodiments of the inventive processor are (or include) a general or special purpose processor (e.g., a digital signal processor or microprocessor implemented as an integrated circuit (chip) or chip set) which is programmed with software (or firmware) and/or otherwise configured to perform an embodiment of the inventive method. Another aspect of the invention is a computer readable medium (e.g., a disc) which stores code for programming a processor to implement any embodiment of the inventive method.

DETAILED DESCRIPTION OF EMBODIMENTS

Figure 4:
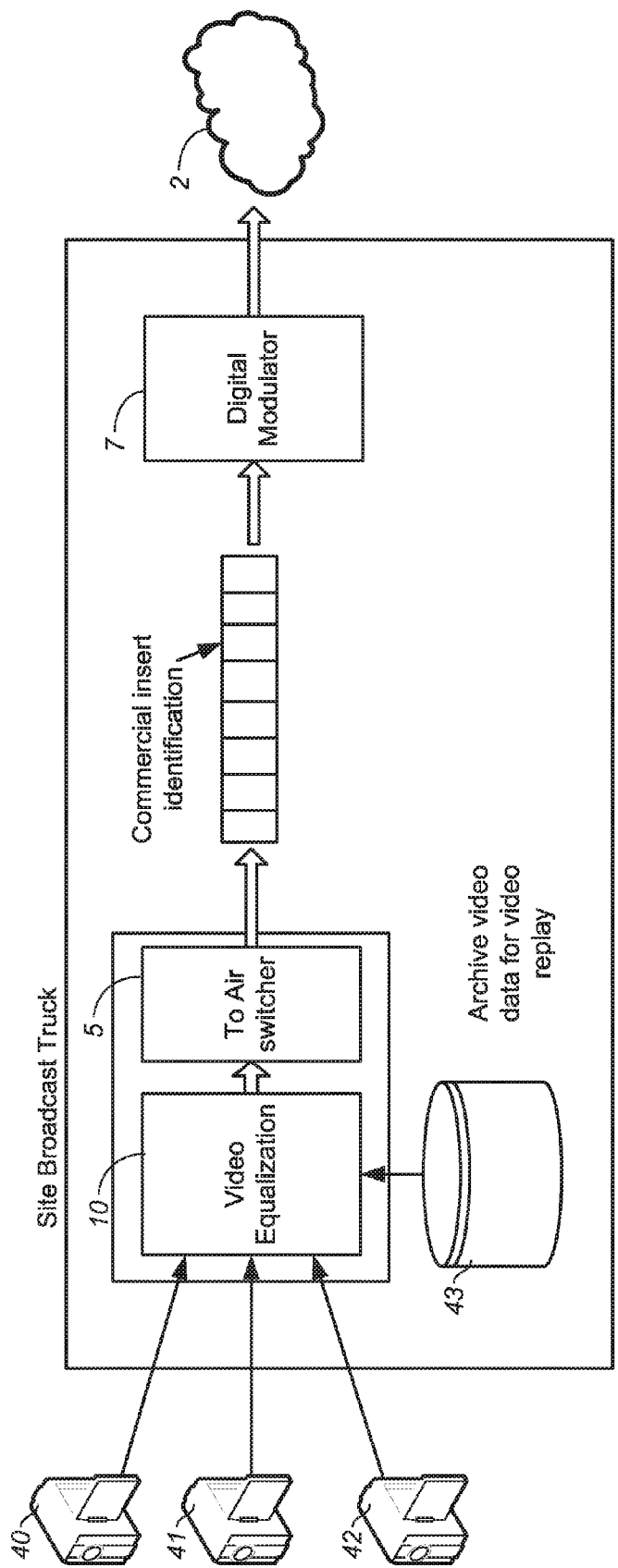
FIG. 4 is a block diagram of another embodiment of the inventive broadcast system.

Embodiments of the inventive video delivery system will be described with reference to FIGS. 2 and 4, and embodiments of the inventive display system will be described with reference to FIGS. 5 and 6.

Figure 1:
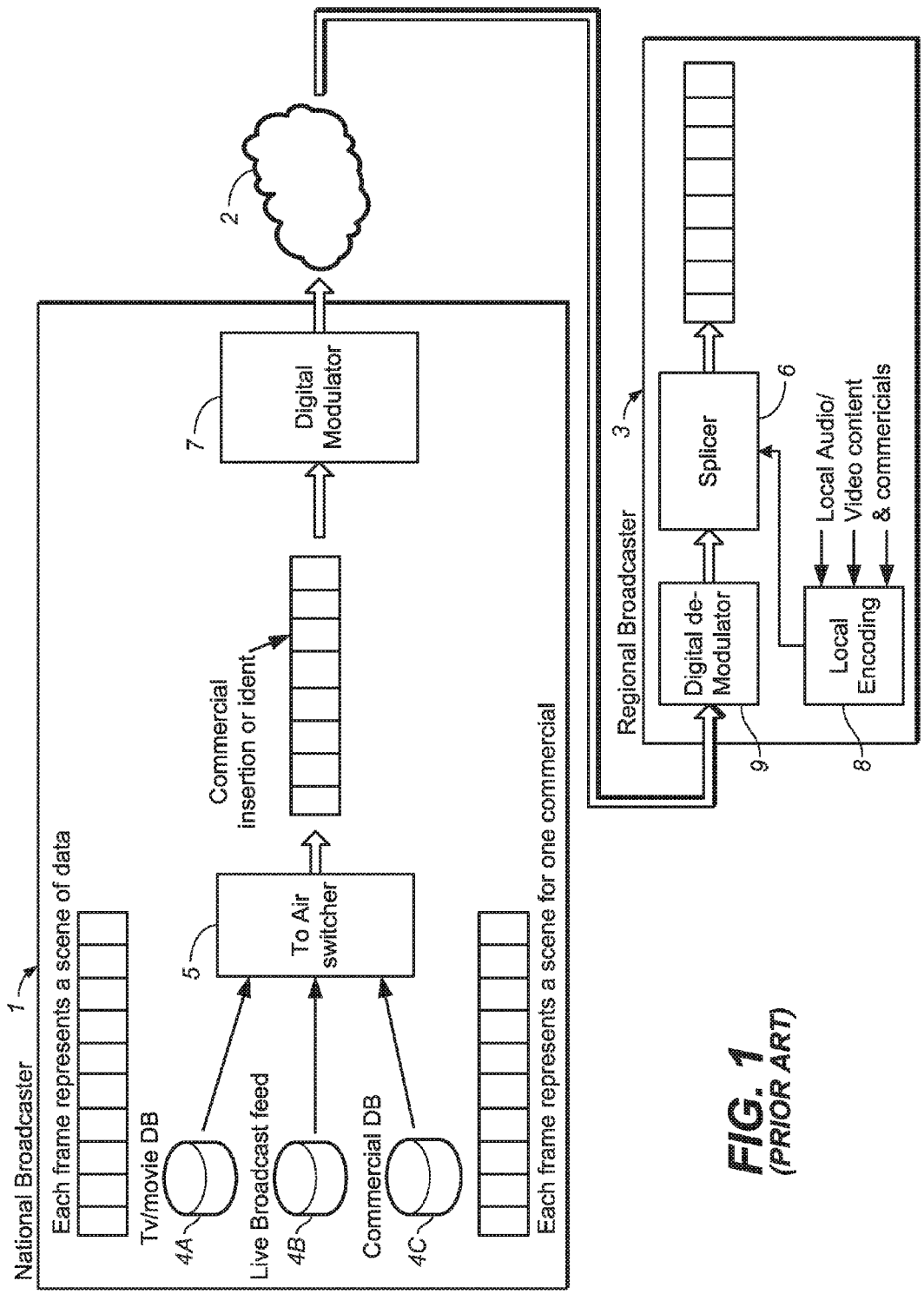
FIG. 1 is a block diagram of a conventional broadcast system.
Figure 2:
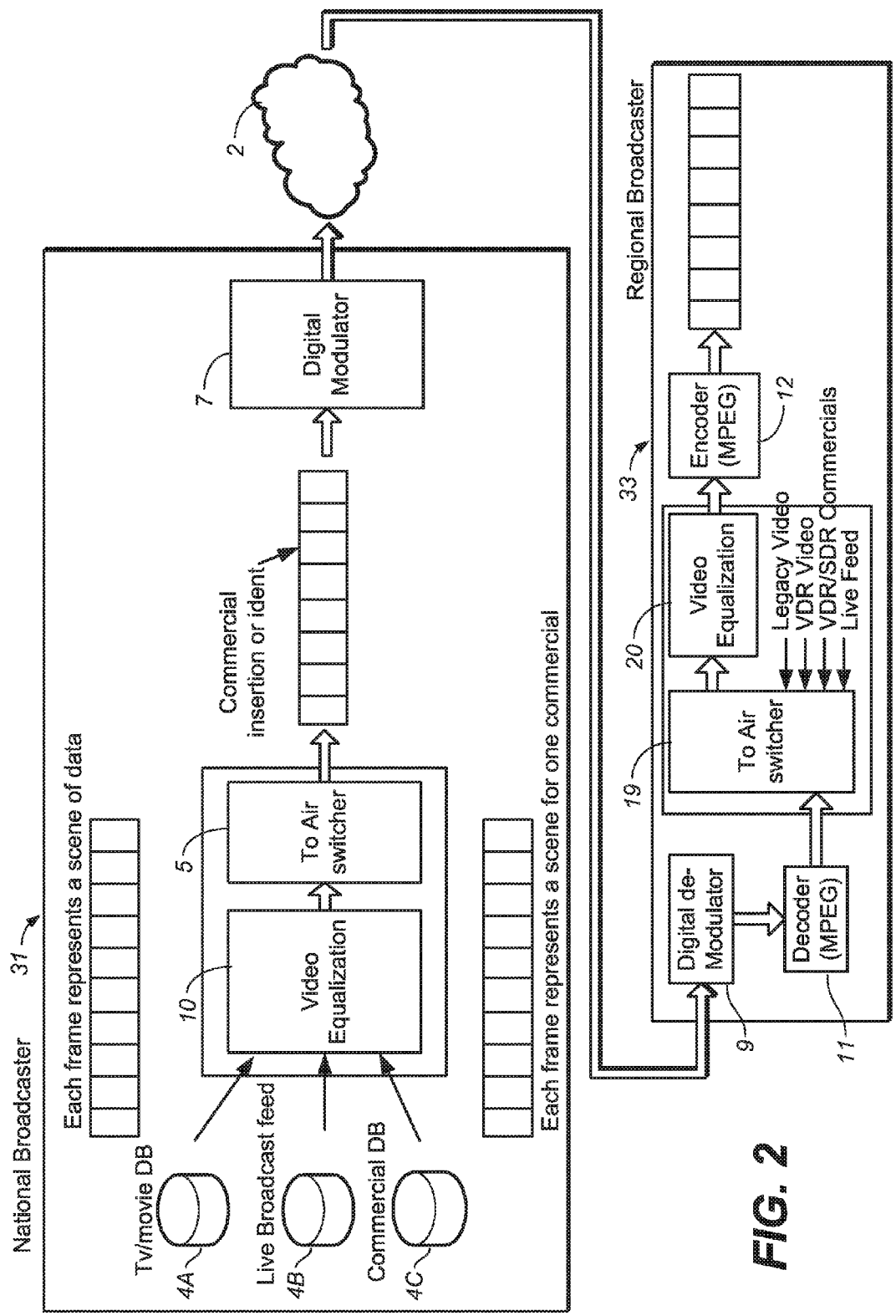
FIG. 2 is a block diagram of an embodiment of the inventive system.

The system of FIG. 2 implements a broadcast pipeline similar to that implemented by the conventional FIG. 1 system, except that it is modified in accordance with an embodiment of the invention to apply equalization to input video from multiple sources (e.g., streams 4A, 4B, and 4C). The input video includes at least one HDR video stream (e.g., a VDR video stream) from at least one of the sources, and at least one SDR video stream from at least one of the sources. The FIG. 2 system is identical to that of FIG. 1 (and elements of FIG. 2 that correspond to elements of FIG. 1 are identically numbered in both figures) except in that national broadcaster installation 31 of FIG. 2 differs from installation 1 of FIG. 1 by including video equalization subsystem 10 coupled between its video sources and switcher 5, and in that regional broadcaster installation 33 of FIG. 2 differs from installation 3 of FIG. 1 by including decoder 11, switcher 19, video equalization subsystem 20, and encoder 12 (connected as shown) in place of local encoder 8 and splicer 6. In demodulator 9 of regional broadcasting installation 33, the received signal is demodulated to recover an encoded video stream (typically an MPEG-2 encoded stream), and the encoded stream is decoded in decoder 11 (typically implemented as an MPEG-2 decoder). Switcher 19 (which can be identical to "to the air switcher" 5 of installation 31) is configured to select what content is multiplexed into the stream to be broadcast by installation 33. The video content multiplexed by switcher 19 includes at least one stream of HDR (e.g., VDR) video and at least one stream of SDR video. Switcher 19 typically time-division multiplexes local commercials, live sports casts, and news shows (which are typically MPEG encoded by local encoder 8) with the decoded stream output from decoder 11. Video equalization subsystem 20 performs equalization on the time-divisional multiplexed stream output from switcher 19 in a manner to be described below, and encoder 12 (typically implemented as an MPEG-2 encoder) encodes the output of equalization subsystem 20, typically by performing the inverse of the decoding performed by decoder 11.

Video equalizer 10 (in national broadcaster installation 31 of FIG. 2) is configured to equalize the streams video content asserted to its inputs to generate streams of equalized video, and switcher 5 is configured to combine (time-division multiplex) selected segments of the streams of equalized video to generate a combined stream, such that the dynamic range of the combined stream output from switcher 5 (and the dynamic range of the compressed (e.g., MPEG-2 encoded) and modulated version of the combined stream output from installation 31) is constant to a predetermined degree (e.g., at least substantially constant) although its content is from a sequence of different input video streams (including both HDR and SDR video streams). Optionally also at least one other characteristic (e.g., at least one of color gamut and white point) of the combined stream output from switcher 5 (and the compressed and modulated version of the combined stream output from installation 31) is also constant to a predetermined degree (e.g., at least substantially constant) although its content is from a sequence of different input video streams (including both HDR and SDR video streams). In some operating modes, switcher 5 inserts, into the combined stream, insertion spots for commercials (downstream trigger points) rather than commercials themselves (i.e., insertion spots for commercials, rather than commercials determined by equalized video output from equalizer 10) Similarly, video equalizer 20 (in regional broadcaster installation 33 of FIG. 2) is configured to adjust the video content at its inputs so that the dynamic range of the combined stream output from equalizer 20 (and the encoded version of this combined stream that is output from installation 33) and optionally also at least one other characteristic of the combined stream (e.g., at least one of its color gamut and white point) is constant to a predetermined degree (e.g., at least substantially constant) although its content is from a sequence of different input video streams (including both HDR and SDR video streams). The video equalization (implemented by equalizer 10 or 20, or by elements 55 and 57 of the FIG. 5 system or elements 65 and 67 of the FIG. 6 system to be described below) is performed with a common anchor point (e.g., a gray level at least substantially equal to a 20% gray level, or another predetermined gray level, or the log mean, or average, or geometric mean, or log of the geometric mean of luminance) for the input video and equalized video, and such that displayed images determined by the equalized video have at least substantially the same average luminance as corresponding displayed images determined by the input video.

In variations on the FIG. 2 system, one but not both, of an upstream stage (e.g., national broadcast installation) and a downstream stage (e.g., regional broadcast installation) of a video delivery (e.g., broadcast) system, is configured to perform video equalization in accordance with the invention. For example, installation 31 of FIG. 2 is replaced by installation 1 of FIG. 1, or installation 33 of FIG. 2 is replaced by installation 3 of FIG. 1. In other embodiments of the invention (e.g., the embodiments to be described with reference to FIGS. 5 and 6), a display system, to which video has been delivered by a video delivery system, is configured to perform video equalization on the delivered video in accordance with the invention.

HDR content (e.g., one of video streams 4A, 4B, and 4C) to be delivered (with SDR video content) by the FIG. 2 system may have a dynamic range of 0 through 10K nits, while the dynamic range of SDR content to be delivered (e.g., legacy content determined by another one of streams 4A, 4B, and 4C) is 0 through 100 (or 500) nits, where "nit" denotes candelas per square meter. In a typical implementation of FIG. 2, each of the SDR and HDR video streams asserted to the inputs of equalizer 10 is encoded as a sequence of code words, each of the code words having value in the range from 0 through 1, where the code word "1" denotes maximum displayed intensity (e.g., 100, 500, or 10K nits, depending on the specific type of the video content). The bit depths of the SDR and HDR video streams can be identical or different. The input video indicated on the left side of FIG. 3 is encoded in such a manner.

In a typical implementation of FIG. 2, SDR video content (e.g., one of streams 4A, 4B, and 4C, or one of the streams input to switcher 19) to be delivered (with HDR video content) is equalized (e.g., in equalizer 10 or 20) by mapping its code values to code values in a subrange of the full range of the HDR content's encoding scheme, such that the mapping expands the dynamic range of the SDR content while keeping the mean of the equalized SDR content's luminance at least substantially equal to that of the original SDR content. Preferably also, the mapping windows the equalized SDR content and the equalized HDR content to a common anchor point (e.g., by mapping the SDR content's 20% gray level to the 20% gray level of the HDR content, or mapping the log mean (or average, or geometric mean, or log of the geometric mean) of the SDR content to the log mean (or average, or geometric mean, or log of the geometric mean) of the HDR content).

Figure 3:
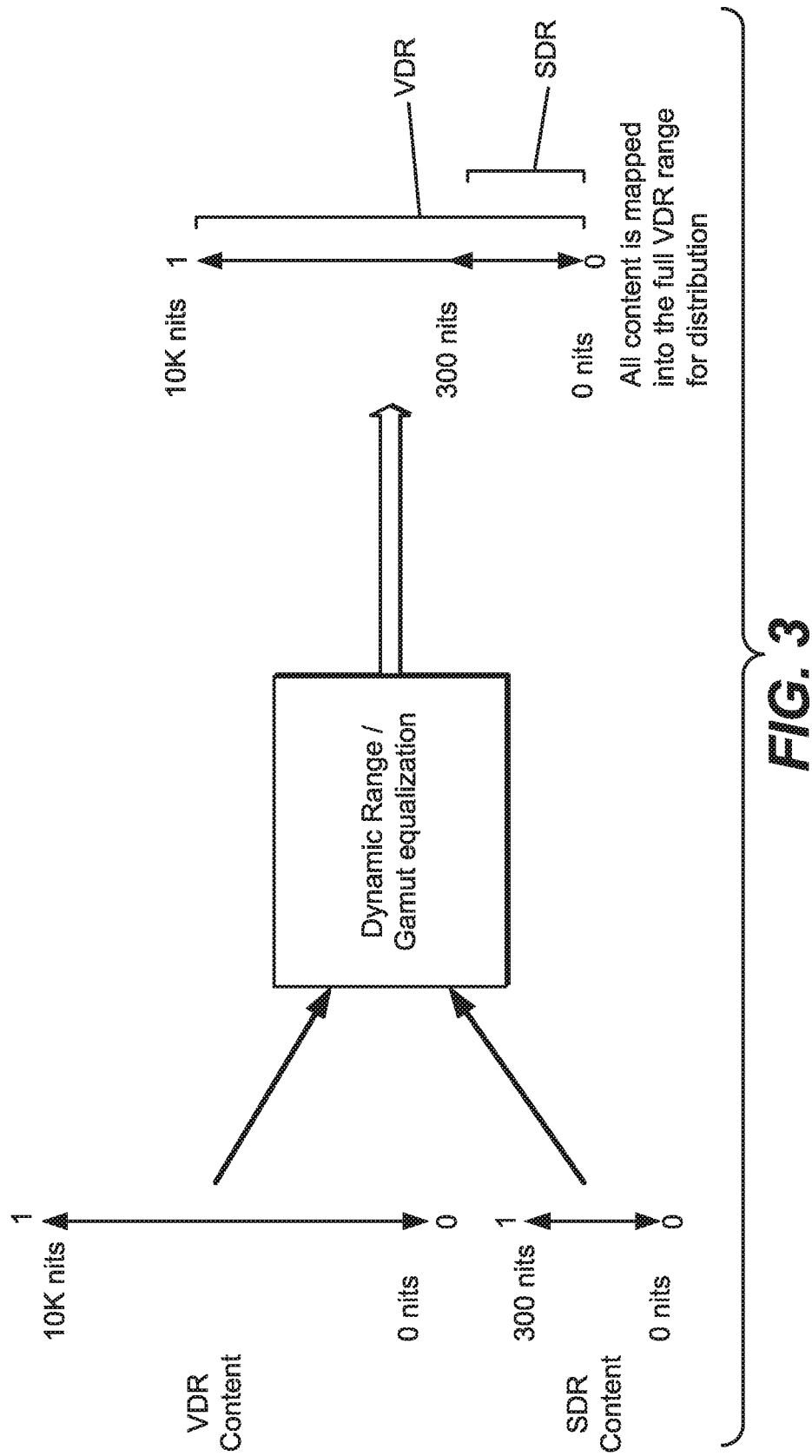
FIG. 3 is a diagram of a code value mapping performed in accordance with an embodiment of the inventive method.

For example, consider the case diagrammed in FIG. 3 in which the full range of code values output from the video equalizer (e.g., equalizer 10 or 20) is the range from 0 through 1, the full range of code values of 300 nit input SDR content (input to the equalizer) is also the range from 0 through 1, and the full range of code values of 10,000 nit HDR content (input to the equalizer) is also the range from 0 through 1. Thus, the FIG. 3 example assumes that the full signaling range for all types of video content input to (or output from) the video equalizer is from 0 through 1, in the sense that each video stream input to the equalizer and each video stream output from the equalizer is encoded as a sequence of code words, each of the code words having value in the range from 0 through 1. With this assumption, during one type of video equalization in accordance with the invention, the code values of input SDR video (e.g., 300 nit SDR video, as indicated in FIG. 3) are mapped (in a "first stage" of mapping) to values in a subrange from 0 through T of the full range of the HDR encoding scheme, where T is substantially less than 1. In the FIG. 3 example (and typical embodiments of the inventive method), the value T is the HDR video code word value indicating a pixel (or color component) of HDR content having luminance equal to the maximum luminance (300 nits in the FIG. 3 example) of the SDR video to be time-division multiplexed with the HDR content. The mapped SDR code values (resulting from the first stage of mapping) are then further mapped to a wider subrange of the full range of the HDR encoding scheme, such that the further mapping (a "second stage" of mapping) expands the dynamic range of the SDR content while keeping the mean of the mapped (equalized) SDR content's luminance at least substantially equal (equal or substantially equal) to that of the original SDR content. However, the code values of input HDR video pass through the equalizer unchanged. In embodiments of this type, the video equalization does not change the input HDR content.

Preferably, the second stage of mapping also windows the equalized SDR content and the equalized HDR content to a common anchor point in the sense that it maps one predetermined code value (of the code values resulting from the first stage of mapping) to the same (or substantially the same) predetermined code value of the code values of the HDR encoding scheme. For example, the predetermined code value may be the 20% gray level of the HDR content, so that the second stage of mapping maps the code value (of the code values resulting from the first stage of mapping) indicative of 20% gray level to the code value (of the equalized SDR code values resulting from the second stage of mapping) indicative of 20% gray level). For another example, the predetermined code value may be the code value (of the HDR content) which is the log mean of the luminance of the SDR code values being equalized, so that the second stage of mapping maps the code value (of the code values resulting from the first stage of mapping) which is the log mean of the luminance of the SDR code values being equalized, to the code value (of the equalized SDR code values resulting from the second stage of mapping) which is the log mean of the luminance of the SDR code values being equalized. Such mapping (which expands the dynamic range of the SDR content while keeping the mean of the equalized SDR content's luminance at least substantially equal to that of the original SDR content and windowing the equalized SDR content and equalized HDR content to a common anchor point) is performed in order to preserve the artistic intent of the SDR input video's originator (in an effort to cause displayed images determined by the equalized SDR video to have at least substantially the same aesthetic characteristics as those determined by the original, unequalized input SDR video).

In some embodiments of the inventive equalization, the expansion of the dynamic range (of input SDR video) which is implemented by the above-described mapping of input SDR video code values (which mapping also keeps the mean of the equalized SDR content's luminance (e.g., intensity or brightness) at least substantially equal to that of the input SDR content) is accomplished by histogram encoding (e.g., as described in U.S. Provisional Patent Application No. 61/453,922, filed Mar. 17, 2011 by Anders Ballestad and Gerwin Damberg, or in U.S. Provisional Patent Application No. 61/474,733, filed Apr. 12, 2011 by Anders Ballestad and Gerwin Damberg, or U.S. Provisional Patent Application No. 61/506,903, filed Jul. 12, 2011 by Anders Ballestad and Gerwin Damberg, all assigned to the assignee of the present application. The full disclosure of each of these provisional applications is hereby incorporated by reference into the present application. Alternatively, the expansion of the dynamic range (of the input SDR video being equalized) is implemented in another manner, e.g., by light source detection expansion (e.g., as described in PCT International Application Publication No. WO 2010/132237 A1, published on Nov. 18, 2010, filed by Dolby Laboratories Licensing Corporation, and assigned to the assignee of the present application), or by expanding only the upper luminance band blindly (straight line expansion). The full disclosure of the PCT International Application referenced in the previous sentence is hereby incorporated by reference into the present application. As mentioned, the mapping which implements the dynamic range expansion preferably also windows the equalized SDR content and the equalized HDR content to a common anchor point (e.g., by mapping the SDR content's 20% gray level to the 20% gray level of the HDR content, or mapping the log mean of the SDR content to the log mean of the HDR content).

When SDR input video and HDR input video (of the type equalized in typical embodiments of the invention) is encoded as a sequence of code words, each of the code words having value in the range from 0 through 1, and such encoded video is conventionally employed (without equalization in accordance with the invention) to display images (a sequence of SDR and HDR images), the displayed images can fluctuate significantly in brightness. However, when such encoded SDR and HDR input video are equalized in accordance with a typical embodiment of the invention (e.g., with the code values indicative of the HDR input video being passed through the equalizer unchanged, and the code values indicative of the SDR input video being mapped to code values in a subrange from 0 through T of the full range of the HDR video encoding scheme and then undergoing a second stage of mapping to expand their dynamic range while keeping the mean of the equalized SDR content's luminance at least substantially equal to that of the original SDR content and windowing the equalized SDR content and equalized HDR content to a common anchor point), and such equalized video is then employed to display a sequence of images, the average brightness of the displayed images will not fluctuate significantly.

In some implementations of FIG. 2, all the input video content (to be delivered) is assumed to have the same white point (e.g., a white point of D65). In other implementations of the inventive system and method, however, the white point of the input video is assumed to be variable depending on the type of input video content to be equalized and how the input video content is encoded, and the inventive system (or method) is implemented to perform video equalization in accordance with the invention in a manner that adjusts for such white point variation. When video content is encoded as a sequence of code words (e.g., with each of the code words having value in the range from 0 through 1) and such encoded video is delivered to an end user and conventionally employed (without equalization in accordance with the invention) to display a sequence of images having different white point (and/or color gamut), variation in the white point can also cause the displayed images to fluctuate significantly in brightness and/or variation in the color gamut can cause the aesthetic appearance of the displayed images to fluctuate significantly. However, when SDR and HDR input video (having varying white point and/or color gamut) is equalized in accordance with an embodiment of the invention, and the equalized video is employed to display a sequence of images, the average brightness (determined by the dynamic range and white point of the equalized video) and aesthetic appearance (determined by the color gamut of the equalized video) of the displayed images will not fluctuate significantly.

With reference again to FIG. 2, video equalization is implemented at two stages in the FIG. 2 system in a different manner at each stage. Specifically, within national broadcaster installation 31 the video content is equalized (in block 10) before the equalized content is time division multiplexed by switcher 5. In regional broadcaster installation 33, the video content is equalized (in block 20) after time division multiplexing of multiple streams in switcher 19. The pre-multiplexing implementation (e.g., in block 10) requires all the input video content to be mapped into a common dynamic range. This can have the disadvantage of requiring multiple mappers (e.g., where equalizer 10 implements a different mapper for each input video stream) and additional buffers to store the data, but typically has the advantage of requiring less analysis (or no analysis) of the input video to be equalized. The post-multiplexing implementation (e.g., in block 20) has the advantage that it typically requires only one mapper, but typically has the disadvantage of requiring analysis of all the video content to be equalized (all the content in the time-division multiplexed stream to be equalized) or detection of metadata (provided with the video content to be equalized) to control the equalization of the single video stream to be equalized (e.g., the output of switcher 19 of FIG. 2).

With the post-multiplexing implementation of equalization (e.g., in block 20), video content to be equalized can be analyzed (to determine the type of equalization to be applied thereto) by a method including one or more of the following steps:

detecting a characteristic of the video content (e.g., determining whether it is Rec. 709 RGB video, or whether it has a white point of D65, or detecting its maximum luminance (e.g., determining that its maximum luminance or intensity is 100 nits), and assuming that the detected characteristic implies that the video has a specific dynamic range (and optionally also a specific white point and/or gamut);

detecting the presence of metadata provided with the video content (e.g., assuming that the video content is HDR content in response to detecting the presence of metadata); or determining from metadata provided with (e.g., appended to) the video content the type of equalization to be applied to the video content.

Some examples of methods for analyzing video content to be equalized (to determine the type of equalization to be performed thereto) are:

monitoring the mean luminance of an image (or each image) determined by the content;

monitoring the geometric mean luminance of an image (or each image) determined by the content monitoring the logarithmic geometric mean luminance of an image (or each image) determined by the content; and monitoring peak brightness.

Different embodiments of the invention accomplish adaptation (equalization) of video content in different ways. Typically, the goal is to adapt content having lesser dynamic range (e.g., SDR content having relatively low dynamic range) to content having greater dynamic range content (e.g., VDR content). However, the adaptation is in the opposite direction (from relatively high dynamic range to relatively low dynamic range) in alternative embodiments (e.g., so that SDR content input to the equalizer passes through the equalizer unchanged and the dynamic range of HDR content input to the equalizer is decreased).

In some embodiments in which a video equalizer (e.g., equalizer 10 or 20) is configured to receive both video (e.g., encoded video) having relatively low dynamic range (low DR content) and video (e.g., encoded video) having relatively high dynamic range (high DR content), one or both of the low DR content and high DR content is live content that has been generated using at least one camera. For example, in the broadcast installation shown in FIG. 4, low DR content and high DR content (to be equalized by video equalizer 10) is generated by a mix of SDR and HDR (e.g., VDR) enabled cameras 40, 41, and 42. In some implementations of FIG. 4, the video to be equalized by equalizer 10 also includes stored video (e.g., video stored in memory 43 of FIG. 4 for video replay use). FIG. 4 is a block diagram of a variation on broadcast installation 31 of FIG. 2, in which equalizer 10 is coupled to receive input streams from cameras 40, 41, and 42 (and optionally also memory 43) rather than video input streams 4A, 4B, and 4C. Metadata from at least one of cameras 40, 41, and 42 (e.g., a camera implementing Cooke/I-technology), which may be indicative of lens type, focus, Iris, F-stop, focal length, shutter, and/or the captured brightness of the content, can be provided to video equalizer 10 and analyzed (by equalizer 10) to drive the equalization. The video equalization can be performed across the cameras only or into the encoding space.

By including an embodiment of the inventive video equalizer as a stage in a display (e.g., display 50 of FIG. 5 or display 60 of FIG. 6), one can ensure that the gamut/Dynamic range can be managed so that to the viewer there is no or very little variance in color or brightness of the display (when a sequence of video streams from different sources are displayed).

Figure 5:
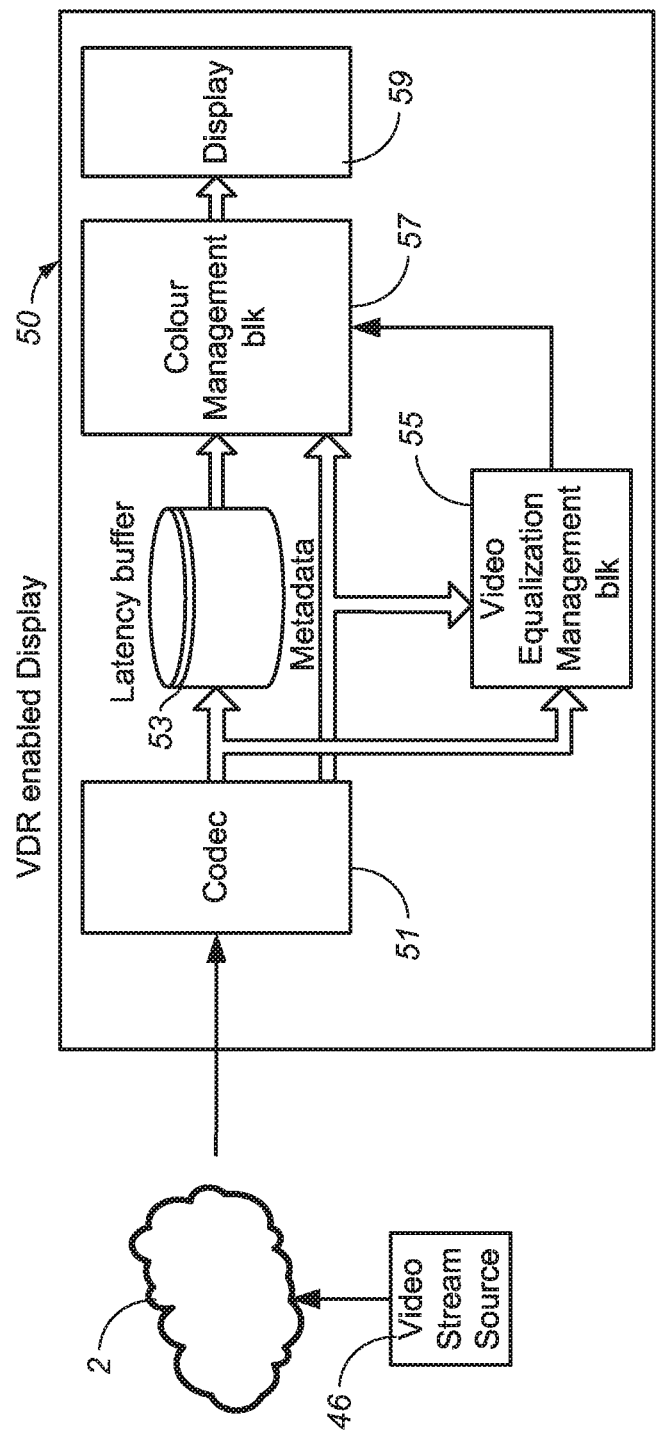
FIG. 5 is a block diagram of a system, including display system 50, wherein display system 50 implements an embodiment of the inventive video equalizer.

FIG. 5 is a block diagram of a system including video stream source 46, delivery subsystem 2, and display system 50. Source 46 is configured to assert to subsystem 2 an encoded (typically, MPEG encoded) video stream. The video stream is a sequence of video segments, time-division multiplexed together, and typically including video segments of different types (e.g., SDR segments time-division multiplexed with HDR segments). The video stream typically includes metadata indicative of the type of video equalization to be applied to the video content of each of the segments (e.g., the metadata may be indicative of the type of video content of each of the segments). The metadata may be included in a header of each of the segments. Source 46 may (but need not) be an implementation of broadcast installation 33 of FIG. 2 that is configured to include metadata of the noted type in the video stream. The video stream output from source 46 may be stored by subsystem 2 (e.g., in the form of a DVD or Blu ray disc), or transmitted by subsystem 2 (which may implement a transmission link or network), or may be both stored and transmitted by subsystem 2.

Display system 50 includes codec 51 which is configured to decode the encoded (typically, MPEG encoded) video stream delivered to system 50 by subsystem 2, and to assert the decoded video content (typically a stream of code values indicative of RBG or Yuv video, or other tri-stimulus data) to latency buffer 53 and to video equalization management stage (equalization manager) 55.

Equalization manager 55 (sometimes referred to as a video equalization management block or "VEB") is configured to provide image analysis of the content by decoding metadata (output from codec 51) and/or analyzing the decoded content itself (also output from codec 51). The result of the analysis enables equalization manager 55 to assert control data (e.g., mapping parameters) to color management block 57 to enable block 57 to perform video equalization in accordance with the invention on the decoded video stream read out from buffer 53 (to generate an equalized video stream). Block 57 typically also performs other (conventional) processing on the equalized video stream to generate display data for driving HDR display 59, to cause display 59 to display a sequence of images determined by the display data. Display 59 is configured to display HDR video, and thus is configured to display a sequence of images in response to an equalized video stream comprising equalized SDR segments (equalized by mapping input SDR code values to code values of an HDR encoding scheme in accordance with an embodiment of the inventive method) time-division multiplexed with HDR segments (which are typically unchanged during equalization in accordance with the implemented embodiment of the inventive method).

During performance of video equalization in accordance with the invention, block 57 typically:

identifies SDR content and HDR content in the video stream read from buffer 53 (e.g., in response to identification of corresponding metadata from codec 51, or in response to identification of control data from block 55 determined from such metadata); and equalizes the SDR and HDR content (e.g., maps the code values of the SDR content to code values of the HDR encoding scheme, and passes through unchanged the code values of the HDR content, in accordance with an embodiment of the inventive equalization method. For example, the equalization of SDR content can be performed when SDR video commercials are detected in a stream of HDR video segments). Block 57 can also enable a mode of operation of display 50 which phases transitions to or from SDR content and HDR content to prevent huge changes in the visual presentation during such transitions.

Block 55 can guide video equalization (performed by block 57) in either of two methods:

generating mapping parameters for color management block 57 (e.g., using assumed prediction parameters for identified SDR content, e.g., by assuming that identified SDR content is REC709 video having 100 nit dynamic range and a white point of D65); or creating metadata from analysis of video content from codec 51, and asserting the metadata to color management block 57 to allow block 57 to generate required mapping parameters and perform all mapping required to perform equalization on the content from buffer 53. Alternatively (e.g., in another operating mode of display system 60), such metadata is asserted directly from codec 51 to block 57.

Latency buffer 53 is configured to capture the decoded video data from codec 51, and accounts for the latency within block 55.

Color Management block 57 is configured to perform equalization, typically including by performing dynamic range expansion (or compression) using mapping algorithms of the type described herein (e.g., with reference to equalizers 10 and 20 of FIG. 2). The equalization is guided by parameters driven out of block 55 (or asserted directly to block 57 from codec 51). Blocks 55 and 57, considered together, implement a video equalizer.

Figure 6:
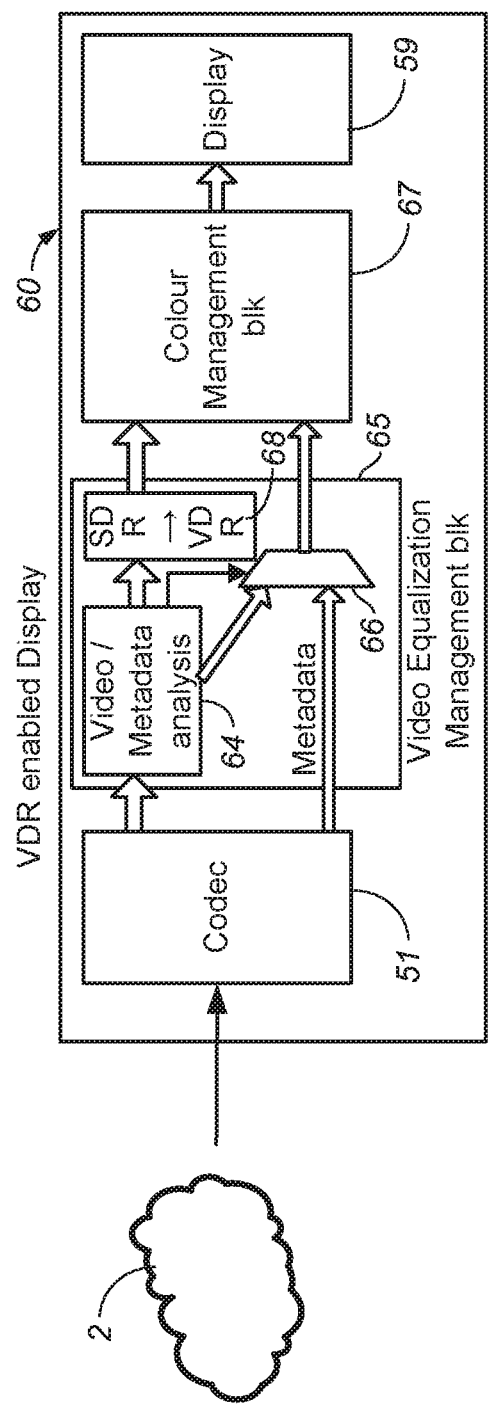
FIG. 6 is a block diagram of a display system (60) which implements another embodiment of the inventive video equalizer.

FIG. 6 is a block diagram of a display system (60) which implements another embodiment of the inventive video equalizer. All elements of FIG. 6 which are identical to corresponding elements of FIG. 5 are identically numbered in FIGS. 5 and 6.

Architecturally, display system 60 is in alternative implementation of display system 50 of FIG. 5 display, in which the equalization manager (video equalization management block 65) is configured to be inline of the video path and to normalize SDR content to the HDR range (in normalization stage 68) and to drive out (to color management block 67) HDR video content and normalized SDR video content for equalization. Blocks 65 and 67 of display system 60, considered together, implement a video equalizer. In response to the equalized video generated in block 67, block 67 generates (and asserts to HDR display 59) display data displayable by HDR display 59. Equalization in block 67 is guided by control data generated in block 64 and asserted via multiplexer 66 to block 67, or by metadata (metadata from codec 51, or metadata newly generated in block 64) asserted via multiplexer 66 to block 67. The latency of multiplexer 66 accounts for the time required for video analysis and normalization within elements 64 and 68.

Display system 60 includes codec 51 which is configured to decode the encoded (typically, MPEG encoded) video stream delivered to system 50 by subsystem 2, and to assert the decoded video content (typically a stream of code values indicative of RBG or Yuv video, or other tri-stimulus data) to block 65, and optionally also to assert to block 65 metadata (indicative of the type of video equalization to be applied to the video content of each segment of the decoded video stream) extracted from the encoded video delivered by subsystem 2.

Video/metadata analysis stage 64 of block 65 is configured to pass through the decoded video from codec 51 to normalization stage 68. Stage 68 is configured to normalize SDR content of the video to the HDR range and to drive out (to color management block 67 for equalization) a normalized video stream comprising segments of HDR video content and normalized SDR video content. Block 67 is configured to generated equalized video in response to the normalized stream from stage 68 and, in response to the equalized video, to generate (and assert to HDR display 59) display data displayable by HDR display 59.

Video/metadata analysis stage 64 is also configured to provide image analysis of the decoded video content from codec 51 by analyzing the decoded content. As a result of the analysis, stage 64 asserts control data (e.g., mapping parameters) and/or metadata to color management block 67 (via multiplexer 66) to enable block 67 to perform video equalization in accordance with the invention on the normalized, decoded video stream from stage 68 (to enable block 57 to generate an equalized video stream). Stage 64 may assert to element 66 a control bit (or other control signal) which selects the data (e.g., metadata from codec 51 or control data (or metadata) generated in stage 64) asserted at the output of element 66 to block 67. Stage 64 also asserts control data and/or metadata (indicative of whether the current segment of the video stream is SDR or HDR content) to normalization stage 68, to enable stage 68 to normalize the SDR content to the HDR range.

Optionally, metadata indicative of the type of video in each of the segments of the stream output from codec 51 (and thus the video equalization to be performed on each of the segments) is provided to multiplexer 66 from codec 51, or is generated by stage 64 by analyzing the decoded video from codec 51 (and asserted by stage 64 to multiplexer 66). Multiplexer 66 asserts to block 67 the control data and/or metadata generated by stage 64, or the metadata from codec 51 that coincides with the video source.

As well as performing video equalization in accordance with the invention on the video stream from stage 68 (to generate an equalized video stream), color management block 67 typically also performs other (conventional) processing on the equalized video stream to generate display data for driving HDR display 59, to cause display 59 to display a sequence of images determined by the display data. Display 59 is configured to display HDR video, and thus is configured to display a sequence of images in response to an equalized video stream comprising equalized SDR segments (equalized by mapping input SDR code values to code values of an HDR encoding scheme in accordance with an embodiment of the inventive method) time-division multiplexed with HDR segments (which are typically unchanged during equalization in accordance with the implemented embodiment of the inventive method).

Other aspects of the invention are a processor (e.g., a FPGA, an ASIC, or a system on a chip (SOC)) configured to perform any embodiment of the inventive encoding method (e.g., equalizer 10 of FIG. 2 or FIG. 4, equalizer 20 of FIG. 2, elements 55 and 57 of FIG. 5, or elements 65 and 67 of FIG. 6, implemented as a general or special purpose processor), and a system including such a processor and a subsystem for generating input video (to be equalized in accordance with the invention), and optionally also one or both of a delivery subsystem configured to store and/or transmit an encoded representation of equalized video generated in accordance with the invention, and a display subsystem for displaying equalized video generated in accordance with the invention. Embodiments of the inventive processor are (or include) a general or special purpose processor (e.g., a digital signal processor or microprocessor implemented as an integrated circuit (chip) or chip set) which is programmed with software (or firmware) and/or otherwise configured to perform an embodiment of the inventive method. Another aspect of the invention is a computer readable medium (e.g., a disc) which stores code for programming a processor to implement any embodiment of the inventive method.

The present invention may suitably comprise, consist of, or consist essentially of, any of the steps and elements (the various parts and features of the invention) and their equivalents as described herein. Some embodiments of the present invention illustratively disclosed herein are practiced in the absence of one or more of the steps and elements described herein, whether or not this is specifically disclosed herein. Numerous modifications and variations of the present invention are possible in light of the above teachings. It is therefore to be understood that within the scope of the appended claims, the invention may be practiced otherwise than as specifically described herein.

What is claimed is:

1. A method of video equalization, said method comprising:
   receiving input video including a first video stream having a first dynamic range and second video stream having a second dynamic range different than said first dynamic range;
   defining a common anchor point associated with said input video and equalized video to be generated;
   performing equalization on said input video based on said common anchor point to generate said equalized video, said equalized video defining a sequence of images having dynamic range that is constant to a predetermined degree; and wherein said sequence of images includes at least one image associated with said first video stream and at least one image associated with said second video stream; and images of said sequence of images have substantially the same average luminance as associated images of said input video; and wherein said first dynamic range is larger than said second dynamic range;

said first video stream is encoded with code values having a full range; and said step of performing equalization on input video comprises mapping code values of said second video stream to code values in a subrange of said full range of code values associated with said first video stream such that said mapping expands said second dynamic range.

2. The method of claim 1, further comprising performing equalization on said input video such that said sequence of images of said equalized video has at least one of color gamut and white point that is constant to a predetermined degree.

3. The method of claim 1, wherein said sequence of images of said equalized video has dynamic range that is substantially constant.

4. The method of claim 3, further comprising performing equalization on said input video such that said sequence of images of said equalized video has at least one of color gamut and white point that is substantially constant.

5. The method of claim 1, wherein said common anchor point comprises a predetermined gray level.

6. The method of claim 5, wherein said predetermined gray level comprises a 20% gray level.

7. The method of claim 1, wherein said common anchor point comprises the log mean of luminance of said input video.

8. The method of claim 1, wherein said common anchor point comprises one of the average, the geometric mean, and the log of the geometric mean of luminance of said input video.

9. The method of claim 1, wherein:

said input video comprises an input video stream having a sequence of input video segments;

said step of performing equalization includes performing equalization on said input video segments to generate a sequence of equalized video segments;

video of at least one of said input video segments is adjusted such that a sequence of images defined by said sequence of equalized video segments has substantially-constant dynamic range; and images defined by said input video segments do not have substantially-constant dynamic range.

10. The method of claim 9, further comprising determining said equalization to be performed on each of said input video segments by analyzing said input video stream.

11. The method of claim 9, further comprising determining said equalization to be performed on each of said input video segments based on metadata provided with said input video stream.

12. The method of claim 9, further comprising generating said input video stream by decoding an encoded video stream delivered by a video delivery system.

13. The method of claim 1, further comprising:

performing equalization on video segments associated with a plurality of video streams of said input video to generate equalized video segments; and combining said equalized video segments into a combined video stream; and wherein said equalization adjusts video of at least one of said video segments such that images defined by said combined video stream have substantially-constant dynamic range; and said images defined by said combined video stream are associated with different ones of said plurality of video streams of said input video having different dynamic ranges.

14. The method of claim 1, wherein said dynamic range of said sequence of images of said equalized video comprises said first dynamic range.

15. The method of claim 14, wherein:

said first dynamic range is greater than said second dynamic range; and said step of performing equalization comprises expanding said second dynamic range.

16. A display system comprising:

a video equalizer coupled and configured to receive an input video stream and to perform equalization on said input video stream to generate an equalized video stream, said input video stream comprising a plurality of video segments including at least one video segment having a first dynamic range and at least one video segment having a second dynamic range different than said first dynamic range; and a subsystem coupled to said video equalizer and configured to display images in response to said equalized video stream; and wherein said equalized video stream defines a sequence of images including at least one image associated with at least one of said video segments having said first dynamic range and at least one image associated with at least one of said video segments having said second dynamic range, said sequence of images having dynamic range that is constant to a predetermined degree;

said video equalizer is further configured to perform said equalization based on a common anchor point associated with said input video stream and said equalized video stream; and images defined by said equalized video stream have at least substantially the same average luminance as associated images defined by said input video stream; and wherein said video equalizer is configured to determine said equalization to be performed on each of said video segments of said input video stream by analyzing said input video stream; and perform said determined equalization for each of said video segments such that said equalized video stream includes a sequence of equalized video segments.

17. The display system of claim 16, further comprising a decoding stage configured to receive an encoded video stream, generate said input video stream by decoding said encoded video stream, and provide said input video stream to said video equalizer.

18. The display system of claim 17, wherein:
said decoding stage is further configured to provide metadata to said video equalizer with said input video stream; and
said video equalizer is further configured to
determine said equalization to be performed on each of said video segments of said input video stream based on said metadata and
perform said determined equalization for each of said video segments such that said equalized video stream includes a sequence of equalized video segments.

19. The display system of claim 16, wherein said video equalizer is further configured to perform said equalization such that said sequence of images defined by said equalized video stream has at least one of color gamut and white point that is constant to a predetermined degree.

20. A method of video equalization, said method comprising:
receiving input video including a first portion having a first dynamic range and second portion having a second dynamic range different than said first dynamic range;
defining a common anchor point associated with said input video and equalized video to be generated;
performing equalization on said input video based on said common anchor point to generate said equalized video, said equalized video defining a sequence of images having dynamic range that is constant to a predetermined degree; and wherein
said sequence of images includes at least one image associated with said first portion of said input video and at least one image associated with said second portion of said input video;
images of said sequence of images have substantially the same average luminance as associated images of said input video;
said input video comprises an input video stream having a sequence of input video segments;
said step of performing equalization includes performing equalization on said input video segments to generate a sequence of equalized video segments;
video of at least one of said input video segments is adjusted such that a sequence of images defined by said sequence of equalized video segments has substantially-constant dynamic range; and
images defined by said input video segments do not have substantially-constant dynamic range.

21. The method of claim 20, further comprising determining said equalization to be performed on each of said input video segments by analyzing said input video stream.

22. The method of claim 20, further comprising determining said equalization to be performed on each of said input video segments based on metadata provided with said input video stream.

23. The method of claim 20, further comprising generating said input video stream by decoding an encoded video stream delivered by a video delivery system.

24. A method of video equalization, said method comprising:
receiving input video including a first video stream having a first dynamic range and second video stream having a second dynamic range different than said first dynamic range;
defining a common anchor point associated with said input video and equalized video to be generated;
performing equalization on said input video based on said common anchor point to generate said equalized video, said equalized video defining a sequence of images having dynamic range that is constant to a predetermined degree; and wherein
said sequence of images includes at least one image associated with said first video stream and at least one image associated with said second video stream;
images of said sequence of images have substantially the same average luminance as associated images of said input video; and
said step of performing equalization includes performing equalization on video segments associated with said first video stream and said second video stream to generate equalized video segments and combining said equalized video segments into a combined video stream;
said equalization adjusts video of at least one of said video segments such that images defined by said combined video stream have substantially-constant dynamic range; and
said images defined by said combined video stream are associated with different ones of said first and second video streams of said input video having different dynamic ranges.

25. A method of video equalization, said method comprising:
receiving input video including a first video stream having a first dynamic range and second video stream having a second dynamic range different than said first dynamic range;
defining a common anchor point associated with said input video and equalized video to be generated;
performing equalization on said input video based on said common anchor point to generate said equalized video, said equalized video defining a sequence of images having dynamic range that is constant to a predetermined degree; and wherein
said sequence of images includes at least one image associated with said first video stream and at least one image associated with said second video stream; and
images of said sequence of images have substantially the same average luminance as associated images of said input video;
said dynamic range of said sequence of images of said equalized video comprises said first dynamic range; and
said first dynamic range is greater than said second dynamic range, and said step of performing equalization comprises expanding said second dynamic range; or
said first dynamic range is less than said second dynamic range, and said step of performing equalization comprises compressing said second dynamic range.

26. The method of claim 25, wherein:
said first dynamic range is greater than said second dynamic range; and
said step of performing equalization comprises expanding said second dynamic range.

27. The method of claim 25, wherein:
said first dynamic range is less than said second dynamic range; and
said step of performing equalization comprises compressing said second dynamic range.

* * * * *